No. 812,719. PATENTED FEB. 13, 1906.
W. BRENTON.
THRESHING MACHINE.
APPLICATION FILED JUNE 20, 1905.
2 SHEETS—SHEET 1.
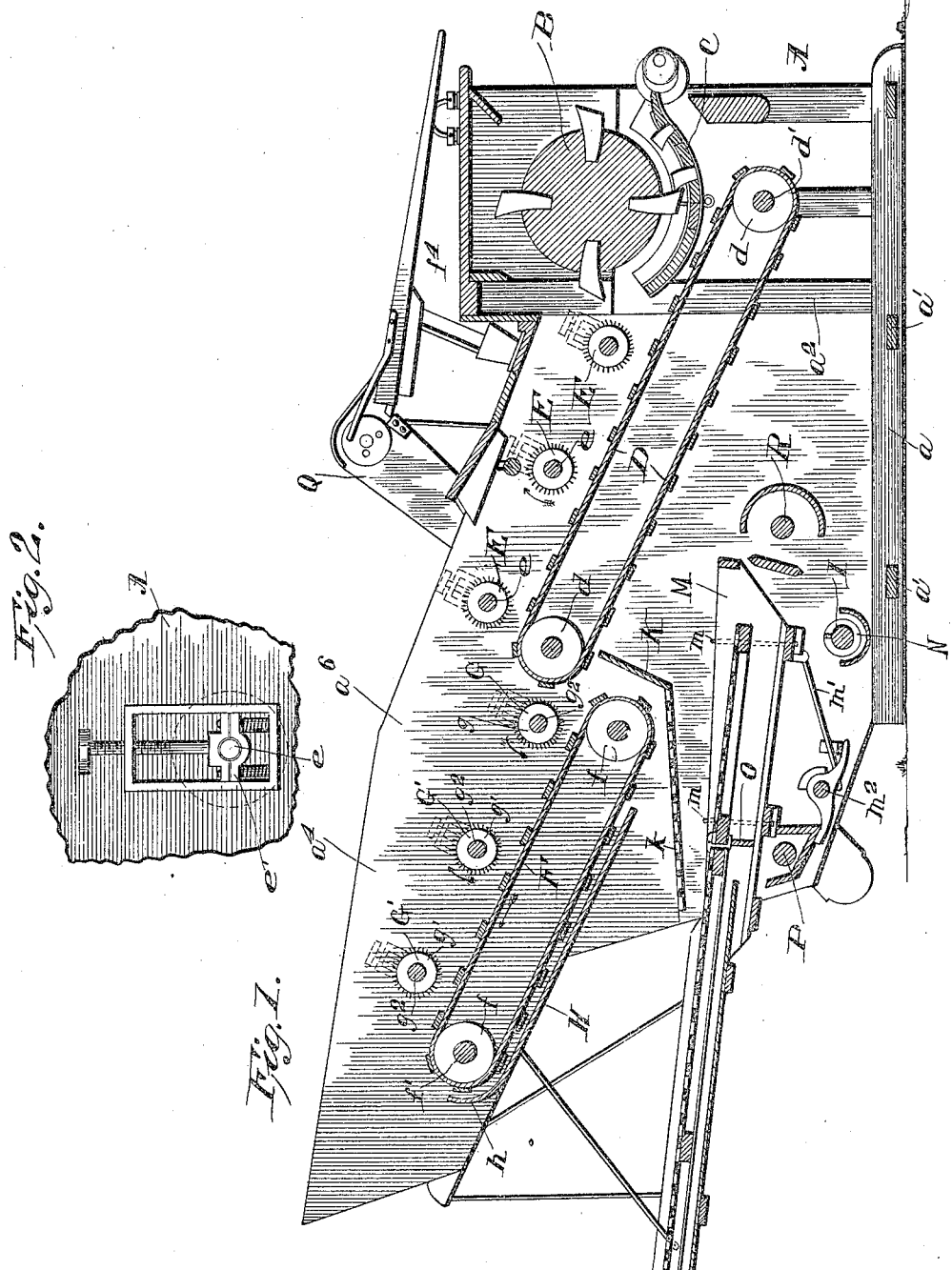
WITNESSES:
E. M. Callaghan
C. E. Trainor
INVENTOR
WILEY BRENTON
BY Munn & Co.
ATTORNEYS

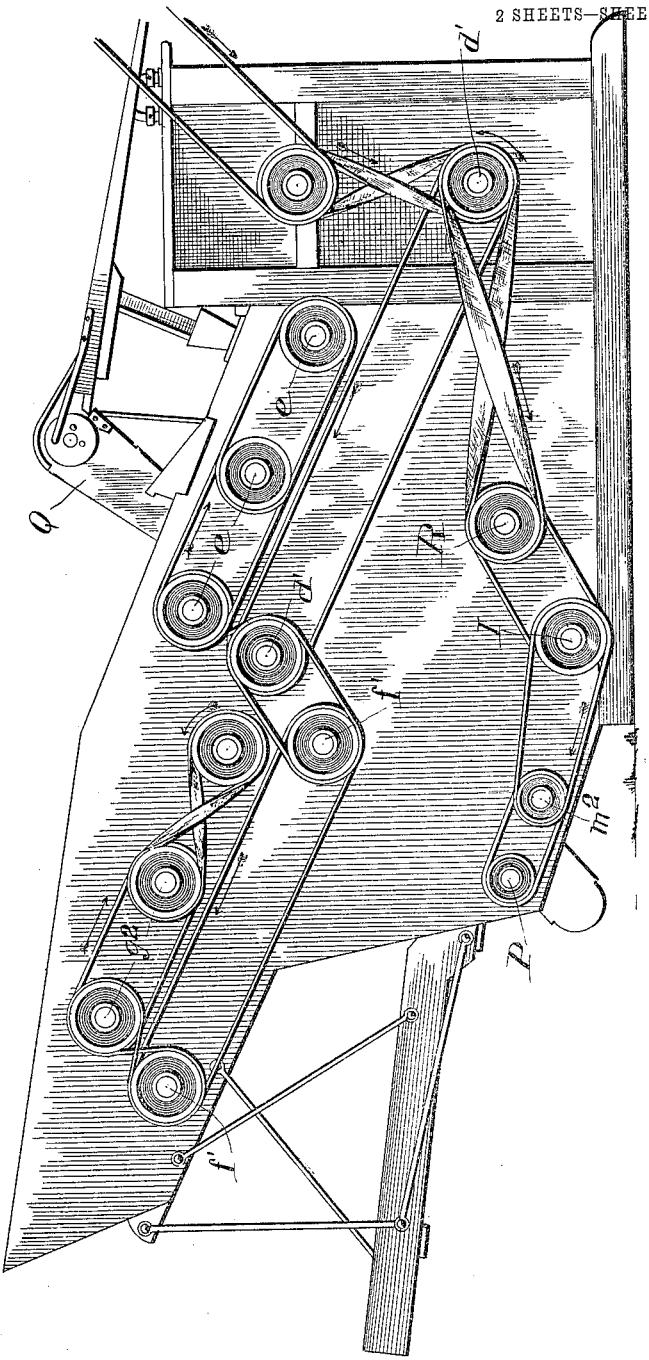

UNITED STATES PATENT OFFICE.

WILEY BRENTON, OF CARLISLE, INDIANA.

THRESHING-MACHINE.

No. 812,719.          Specification of Letters Patent.          Patented Feb. 13, 1906.

Application filed June 20, 1905. Serial No. 266,101.

*To all whom it may concern:*

Be it known that I, WILEY BRENTON, a citizen of the United States, and a resident of Carlisle, in the county of Sullivan and State of Indiana, have made certain new and useful Improvements in Threshing-Machines, of which the following is a specification.

My invention is an improvement in threshing-machines; and it consists in certain novel constructions and combinations of parts hereinafter described and claimed.

Referring to the drawings forming a part hereof, Figure 1 is a longitudinal section of a threshing-machine provided with my improvement. Fig. 2 is a detail of the adjustable bearings for the toothed cylinders, and Fig. 3 is a side elevation showing the arrangement of the gearing for driving the different parts.

In the practical application of my invention I provide a framework A, comprising longitudinal bars $a$, the cross-bars $a'$, and the uprights $a^2$. The uprights $a^2$ are suitably connected by cross-bars $a^4$ at the top, and the framework is supplied with suitable side coverings $a^4$ and a covering for the top $a^6$. A cylinder B of ordinary construction is suitably journaled in the sides of the frame, and below the cylinder is arranged a concave C, also of ordinary construction and suitably supported by the sides of the frame. An endless apron D, supported by rollers $d$, mounted on the shafts $d'$, journaled in the sides of the frame, is arranged below the cylinder to the rear thereof and inclined upwardly at a slight angle therefrom. Coacting with the upper surface of the endless apron are a plurality of toothed cylinders E, each rotating in the same direction with the upper surface of the belt and at a slightly increased speed. The cylinders E are mounted upon the shafts $e$, journaled in adjustable bearings $e'$ in the sides of the frame, and are shown in the present instance as three in number. A second endless apron F, supported by rollers $f$, mounted upon the shafts $f'$, journaled in the sides of the frame, is arranged beneath the rear end of the first-named endless apron and spaced apart slightly therefrom a sufficient distance to allow of the passage of grain between the adjacent ends of the aprons, yet near enough to receive the straw delivered by the first apron. Cylinders G G', supported by the shafts $g$ $g'$, journaled in adjustable bearings $g^2$ in the sides of the frame, are arranged above the endless apron F for coacting with the upper run thereof. The cylinder G is arranged to rotate in an opposite direction to the travel of the upper run of the endless apron F, while the cylinders G' are arranged to travel in the same direction with the said upper run. A floored grain-board H, having an upwardly-curved rear end $h$, is arranged beneath the lower run of the endless apron F for receiving the threshed grain from the endless apron and guiding the same onto a riddle K, a grain-board $k$ being arranged at the front of the riddle and projecting upwardly to guide the grain falling between the adjacent ends of the aprons onto the riddle.

A shoe M, suspended by the rods or links $m$ from the sides of the frame and driven by a pitman $m'$ from a transverse crank-shaft $m^2$ at the rear of the machine, is arranged below the riddle for receiving the grain passing therethrough. The shoe, however, forms no part of my present invention, and I have not deemed it necessary to further describe the same.

A screw conveyer N of ordinary construction is arranged transversely of the machine beneath the forward end of the shoe for conveying the clean grain from the machine. A transverse check-board O is arranged approximately centrally of the shoe, and to the rear of the check-board and beneath the shoe is arranged a second screw conveyer P for conveying the tailings to the elevator Q, by which they are returned into the machine for a second cleaning.

The first apron B is inclined upwardly only enough to receive the forward end of the second apron thereunder, and a straw-carrier of ordinary construction may be arranged to the rear of the second apron to receive the threshed straw and to convey the same from the machine.

The bearings $e'$ of the cylinders E and the bearings $g^2$ of the cylinders G G' are adjustable to and from the upper run of the apron, this adjustment being shown in Fig. 2. The bearing comprises upper and lower sections $e^2$ $e^3$, secured together by bolts $e^4$ and normally upheld in the guides $e^5$ $e^6$ by the springs $e^7$, a screw-threaded bolt $e^8$, traversing an opening in the guide-frame and swiveled to the bearing-section $e^2$, being provided for raising and lowering the same.

A fan R is arranged to the forward end of the shoe for forcing a current of air therethrough toward the rear of the machine, the fan and shoe being operated by means of suitable bands connected to moving parts of the machine.

For convenience in operating the parts of my improved threshing-machine I preferably make use of the construction and arrangement of belt-gearing shown in Fig. 3, the operation of which will be clearly understood from the drawings in connection with the arrows thereon.

In operation the straw or grain is passed by the cylinder onto the endless apron and is moved toward the rear of the machine, the cylinder E agitating the straw and dislodging the grain during its passage. At the end of the conveyer the dislodged grain falls between the aprons upon the riddle, while the straw passes upon the upper surface of the cylinder G and between the cylinders G G' to the endless apron F, where it is agitated a second time. The threshed grain falls from the endless apron F onto the grain-board and from thence through the riddle and into the shoe.

It will be evident from the description that by the use of my invention the machine may be made lighter and of smaller size than existing machines. All shakers and crank-shafts being dispensed with, the machine will be smoother in operation, less noisy, and more durable.

My invention is capable of use in machines for threshing wheat, barley, rye, oats, or clover.

Having thus described my invention, what I claim as new, and desire to secure by Letters Patent, is—

1. In a threshing-machine, the combination of a frame, a cylinder journaled in the frame, a concave supported below the cylinder, an endless apron supported behind and beneath the cylinder and inclined upwardly with respect thereto, means for moving the apron, a plurality of toothed cylinders journaled in the frame above the apron and coöperating with the upper run thereof, means for adjusting the cylinders to and from the apron, means for rotating the cylinders in the same direction as the upper run of the apron and at a higher rate of speed, a second endless apron supported beneath the first apron, and spaced apart longitudinally therefrom, a grain-board beneath the apron, means for moving the apron, a toothed cylinder journaled above the second apron and coöperating with the upper run thereof, means for adjusting the cylinder to and from the apron, means for rotating the cylinder in a direction opposite to the movement of the upper run of the apron, and at a higher rate of speed, a plurality of toothed cylinders journaled behind the first cylinder and coöperating with the upper run of the apron, means for rotating the cylinders in the same direction as the upper run of the apron, and at a higher rate of speed, means for adjusting the cylinders to and from the apron, a riddle beneath the adjacent ends of the aprons, a grain-board secured to the forward end of the riddle, a shoe beneath the riddle, means for vibrating the shoe, and means for operating the parts in synchronism and in timed relation with each other.

2. In a threshing-machine, the combination of a frame, a cylinder journaled in the frame, an endless apron supported below the cylinder and inclined with respect thereto, means for moving the apron, a plurality of toothed cylinders coöperating with the upper run of the apron, means for rotating the cylinders in the same direction as the movement of the upper run of the apron and at a higher rate of speed, a second endless apron supported beneath the first apron and spaced apart longitudinally therefrom, a grain-board beneath the apron, means for moving the second apron, a toothed cylinder supported above the second apron and coöperating with the upper run thereof, means for rotating the cylinder in a direction opposite to the movement of the upper run of the apron, and at a higher rate of speed, a second cylinder behind the first cylinder and coöperating with the upper run of the apron, means for rotating the second cylinder in the direction of movement of the upper run of the apron, and at a higher rate of speed, a vibrating shoe below the apron, means for vibrating the shoe, and means for actuating the parts in timed relation with respect to each other.

WILEY BRENTON.

Witnesses:
  CLAUDE A. ELLIS,
  THOMAS S. RISINGER.